US008228520B2

(12) United States Patent
Snyder

(10) Patent No.: US 8,228,520 B2

(45) Date of Patent: Jul. 24, 2012

(54) PRINT SYSTEM MOTION SENSOR WITH FEEDBACK CONTROL

(75) Inventor: Trevor J. Snyder, Newberg, OR (US)

(73) Assignee: Xerox Corporation, Norwalk, CT (US)

( * ) Notice: Subject to any disclaimer, the term of this patent is extended or adjusted under 35 U.S.C. 154(b) by 52 days.

(21) Appl. No.: 12/858,395

(22) Filed: Aug. 17, 2010

(65) Prior Publication Data

US 2010/0309523 A1 Dec. 9, 2010

Related U.S. Application Data

(62) Division of application No. 11/426,850, filed on Jun. 27, 2006, now Pat. No. 7,794,040.

(51) Int. Cl.
*G06F 3/12* (2006.01)

(52) U.S. Cl. ...................................................... 358/1.13

(58) Field of Classification Search ................. 358/1.13, 358/1.14, 1.15, 1.16
See application file for complete search history.

(56) References Cited

U.S. PATENT DOCUMENTS

| | | | | |
|---|---|---|---|---|
| 6,026,258 | A | 2/2000 | Fresk et al. | |
| 6,151,464 | A | 11/2000 | Nakamura et al. | |
| 6,760,851 | B2 * | 7/2004 | Teshima et al. | 713/320 |
| 7,187,462 | B2 | 3/2007 | Oakeson et al. | |
| 7,456,981 | B2 * | 11/2008 | Kuboki | 358/1.13 |
| 7,965,399 | B2 * | 6/2011 | Miyamoto | 358/1.14 |

* cited by examiner

*Primary Examiner* — Anh T. N. Vo

(74) *Attorney, Agent, or Firm* — Marger Johnson & McCollom PC

(57) ABSTRACT

A print system has a print engine, a presence detector and a controller. The controller receives the signal from the detector, accesses past usage data, and combines the signal and the usage data to adjust operations of the print engine.

11 Claims, 3 Drawing Sheets

FIG. 3
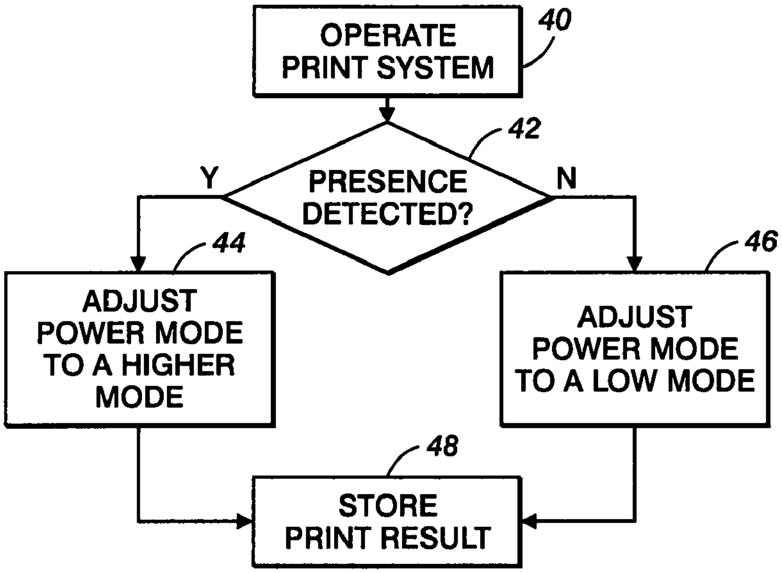
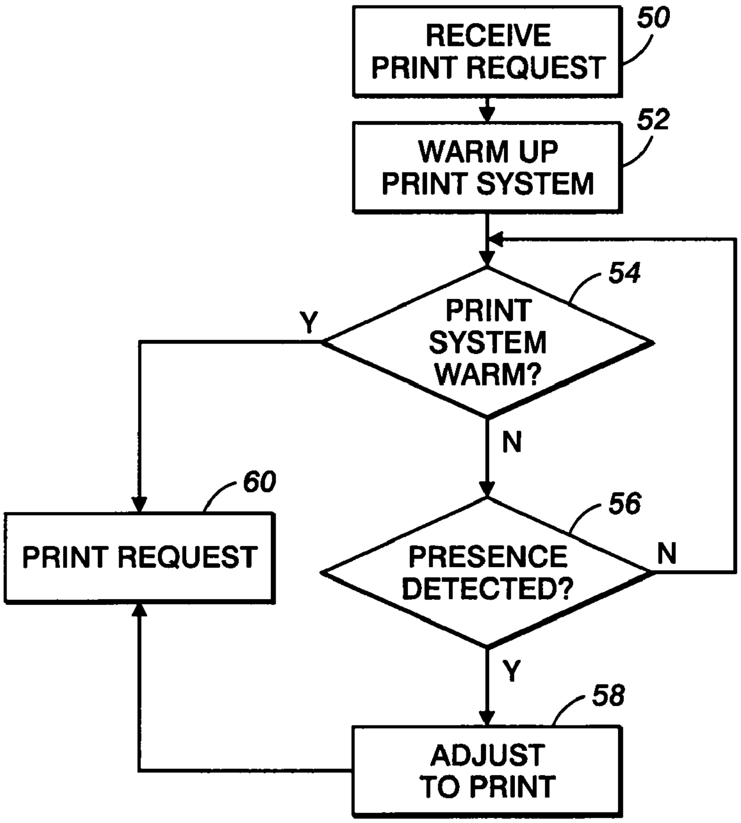
FIG. 4

PRINT SYSTEM MOTION SENSOR WITH FEEDBACK CONTROL

CROSS-REFERENCE TO RELATED APPLICATIONS

This is a Division of co-pending U.S. patent application Ser. No. 11/426,850, filed Jun. 26, 2006, entitled PRINT SYSTEM MOTION SENSOR WITH FEEDBACK CONTROL, the disclosure of which is herein incorporated by reference in its entirety.

BACKGROUND

The solid ink printing process has many advantages over traditional ink jet printing technology. Print speed, color gamut, water fastness, and media flexibility are but a few of the advantages for solid ink printing. Solid ink jet printing generally involves using a solid ink that is melted and jetted onto a transfer surface, and then fixed onto the media from the transfer surface. Because the ink is solid until melted, both the ink and the transfer surface need to be at relatively high temperatures compared to an ink jet printing process using liquid inks. Further, the ink must be kept in a molten state to overcome a relatively long warm-up and purge process that occurs if the ink is allowed to solidify.

Highly engineered mechanisms, set points, inks, and operating software are used to try to meet the combined requirements of fast warm up time, low power usage, and minimal ink cooking. Yet, as competing technologies progress, and companies thrive to improve customer satisfaction, there is increasing pressure to continue to reduce power requirements, reduce warm-up times, and meet all environmental and energy saving programs.

BRIEF DESCRIPTION OF THE DRAWINGS

FIG. 3 shows an embodiment of a method of operating a print system.

FIG. 4 shows an embodiment of a method of operating a print system over a network.

DETAILED DESCRIPTION

Figure 1:
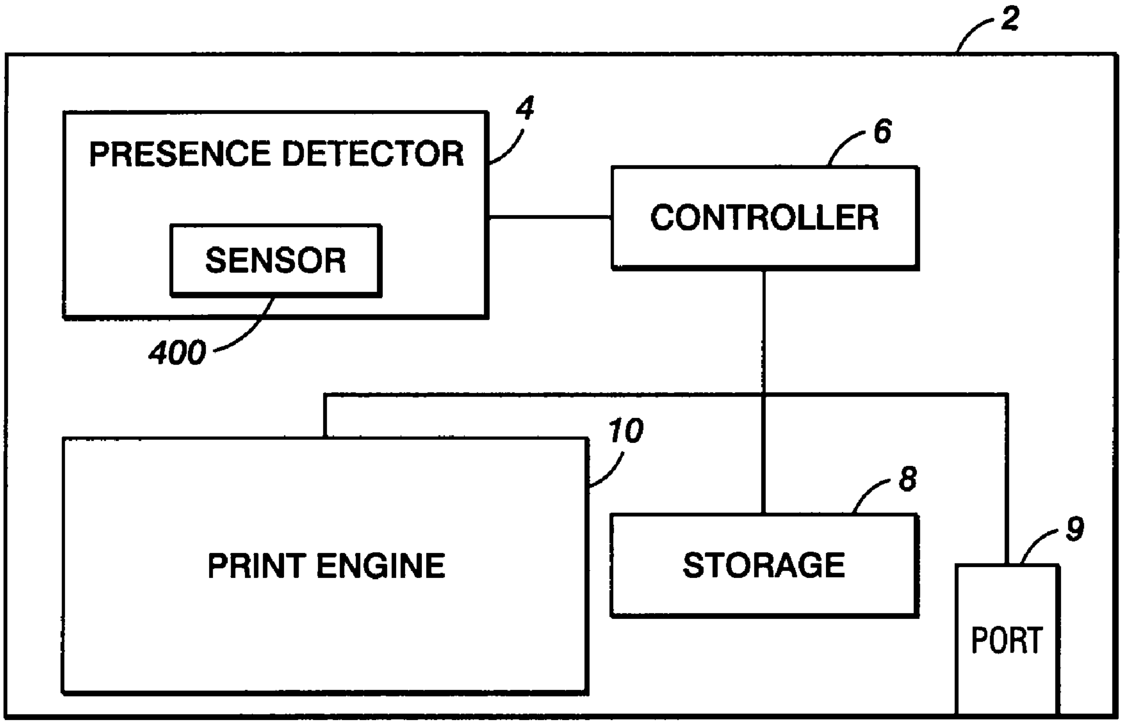
FIG. 1 shows an embodiment of a printing system having a presence detector and a controller.

A print system is shown in FIG. 1. The print system 2 may be any device that has a print capability such as a printer, fax machine, copier or a combination of these capabilities, typically referred to as a multi-function device or multi-function peripheral. The use of the term 'printer' and 'print system' are in now way intended to limit the scope of the claims to any one of these devices.

The print system 2 of FIG. 1 has a print engine 10 that produces printed output, such as text, images, graphics or a mix of any of these. The print engine may receive these requests from a user standing in front of the print system, such as a copier, where the user would place an item to be copied on a platen, not shown. The print system would then scan the item and render an image of it. Similarly, the print engine may receive the requests through the port 9, which may be a serial port connected to a user's personal computer, or may be a network port connecting the print system to the network. The network port may also be an Ethernet port, a wired network port, a wireless port, such as those in compliance with the Institute of Electrical and Electronic Engineers standard 802.11, an infrared port, etc.

Print systems generally have different states of readiness. When the print system is fully warmed up and can print immediately upon receiving a print job, or print request, the system is in a ready mode. When the print system is in its lowest power mode, it will be referred to as being in a sleep power mode. When the print system is in some state between these two, similar to a standby or waiting mode, it will be referred to as being in a low power mode. The print system may have several low power modes.

In many print systems, sleep and low power modes may present problems. For example, with a solid ink printer, the ink must be maintained in a molten state in order to be able to immediately print. If the ink cools beyond a particular temperature, the print head has to be heated and purged before printing can be done. Many different approaches have been used to reduce the time between the print system being in either a low or a sleep power mode and being ready to print. These include varying the temperatures and times that heaters are run for both the print head and the drum, adding insulation to the devices, changing the position of the hot parts relative to other components, and modifying and optimizing the inks.

One approach is to predict time periods of repeated use by analyzing historic usage data. In periods of predicted high use, the print system is kept in the ready power mode, or in low power modes that can reach the ready power mode quickly. In periods of predicted lower use, the print system is moved to power states lower than ready, such as low or sleep power modes. The predicted use, or usage data, may be apportioned in several different ways, such as on a time basis. The usage data may be stored in storage 8 and accessed by the controller, or otherwise used to control the settings of the print system.

In one approach, shown in U.S. Pat. No. 6,243,548, commonly owned by the assignee of the current application, the usage data is set out in a 24 hour by 7 day grid. The usage data in this example consists of a setting, based upon a predicted use of the print system, where the setting corresponds to ready power, low power or sleep power. This is merely one example of usage data and is not intended to limit application of usage data in any way. Many methods of determining power settings based upon predicted use may exist and no restriction to any particular implementation is intended.

In practice, exceptions to the predicted use may result in user dissatisfaction with the warm up time. Adapting a print system to include a presence detector allows supplemental information to be combined with usage data in order to more accurately predicted use and achieve more responsive print systems. The print system 2 of FIG. 1 has a presence detector 4. The presence detector 4 may include a sensor 400, such as a vision system, light, motion, heat, pressure, sound, or vibration sensor, among others, and some logic or other control to generate a signal based upon the data received at the sensor.

As will be discussed later, the presence detector may also include intelligence to control the output of the presence detector, although the intelligence may also reside in the controller 6. The intelligence may be embodied as an algorithm implemented in code and executed by the controller. For example, in the simplest case the controller or presence detector wakes up the printer if the presence detector "sees" anything, in a more complex case the controller wakes up the printer based on the individual printer's probability of getting a job. The probability of the printer receiving a job may be based on the statistical chance based on previous usage patterns versus motion patterns, as an example.

The presence detector may be used in combination with the usage data to adjust the power setting in the presence of a user, as well as adjust the power setting in the absence of a user. The usage data may be stored in the storage 8. As discussed, a desirable outcome is to have a print system ready to print as quickly as possible, which is desirable for any printing system.

Figure 2:
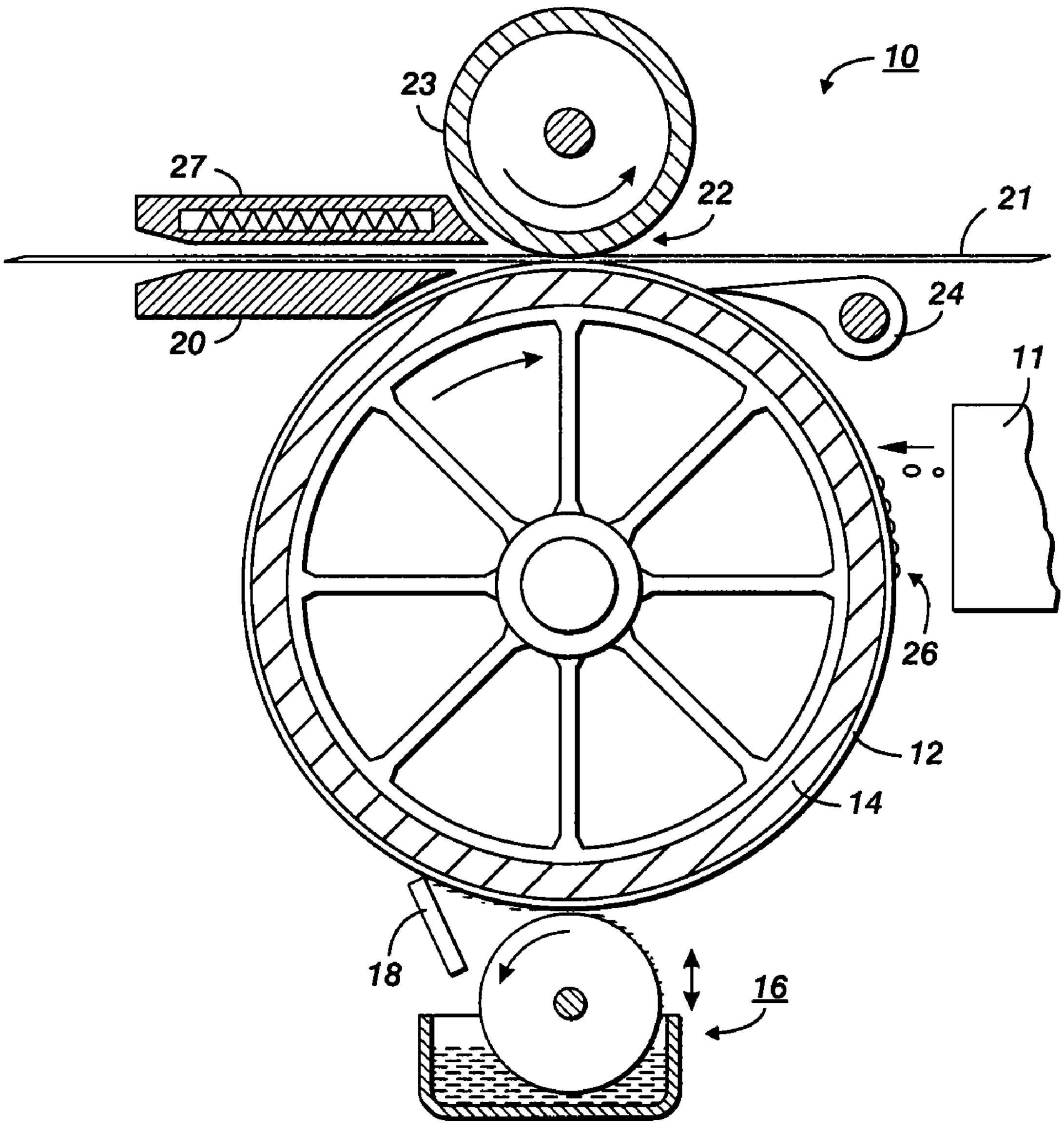
FIG. 2 shows an embodiment of a solid ink print engine.

An example of a solid ink print engine using an intermediate transfer surface is shown in FIG. 2. The print engine 10 shown in FIG. 2 is only intended as an example and it not intended in any way to limit the scope of the claims. The print engine may be any print engine, such as part of a printer, copier, fax machine or a multi-function device that has the capability of performing more than one of these functions. The print system has a print head 11 that deposits ink dot 26 on an intermediate transfer surface 12 to form an image. The support structure 14 supports the intermediate transfer surface 12. For ease of discussion, the support structure will be referred to here as a drum, but may be a drum, a belt, etc. The intermediate transfer surface 12 may be a liquid applied to the support structure 14 by an applicator, web, wicking apparatus, and metering blade assembly 18 from a reservoir 16.

The ink dots 26 form an image that is transferred to a piece of media 21 that is guided past the intermediate transfer surface by a substrate guide 20, and a media pre-heater 27. In solid ink jet systems, the system pre-heats the ink and the media prior to transferring the image to the media in the form of the ink dots. A pressure roller 23 transfers and fixes (transfixes) the ink dots onto the media at the nip 22. The nip is defined as the contact region between the media and the intermediate transfer surface. It is the region in which the pressure roller compresses the media against the intermediate transfer surface. This pressure, combined with elevated temperatures, achieves the transfer of the image. One or more stripper fingers, such as 24, may assist in lifting the media away from the intermediate transfer surface.

The print head 11 is heated to keep the ink in a molten state optimal for jetting needs. The media 21 and the intermediate transfer surface are also heated to allow the solid ink to remain in a visco elastic state for optimal image transfer onto the media. Both the print head and drum take time to achieve operating temperature when transitioning from the non-operating modes. Using the presence detector together with the usage data, it may be possible to reduce the length, or eliminate the impact all together, of the warm-up times, at least for a percentage of the print jobs and/or customers. In this manner, circumstances not anticipated by the usage data may be adapted to both power up the print system in anticipation of use and lower the power setting of the print system in the absence of anticipated use.

For example, it is well known that there is reduced printing for many printers on the weekends. Therefore, using usage data alone, the printer would predict low usage and remain in sleep mode. However, if the print system detected movement, it could adapt by changing to a higher power, lower warm-up time setting, or to the ready power mode. In a more complex example, the combination of motion and usage data may be used to differentiate between users. For example, if the presence detector were to employ a vision system, the print system could use the vision system to identify a user by visual characteristics. For other types of presence detectors, profile or pattern recognition could be used to identify users that have higher print probabilities than others.

Similarly, usage data that has the print system in low power or in ready power mode may be adjusted based upon an absence of users. For example, the usage data may dictate that the print system be in ready power mode on Monday mornings. If a period of time elapses and there is no detection of usage or presence, such as would occur on a holiday that falls on a Monday, the print system may enter a lower power mode than what the usage data would otherwise indicate. This allows the print system to conserve power, while minimizing the risk of causing a user to wait longer than desired for a print job.

Further, the presence detector may also provide data with regard to a need to print quickly. It is possible in some solid ink print systems to print before all of the heated components reach their operating temperatures. For example, a solid ink printer may include capabilities of printing an image when the drum or print head are at a slightly reduced temperature from their normal operating temperature. If faster warm-up can be achieved, it would be desirable to adjust the operating parameters of the print system such that the first print out is as fast as possible with acceptable print quality. Such adjustments may include slower transfix velocity, higher media preheat temperature, lower jetting frequency, drum temperature, a print head temperature, a print head voltage, a print head waveform, etc. In any of the circumstances in which all the components are not at their ready power operating temperatures, however, there may or may not be a reduction in image quality.

Using the presence detector, however, the need to make the trade-off between a possible print quality reduction and faster warm-up time may be controlled. For example, a user sends a print job to the print system across the network. The print system may otherwise try to print the job as quickly as possible, using some of the operational adjustments described above. However, if the print controller determines that the print request came across the network and the presence detector does not indicate a user standing by the print system waiting for the print request to be completed, the print system may enter a process of going to ready. If a user walks up during this warm-up process, the controller may then choose to print using the reduced temperature operating adjustments. Without the presence of a user, then, the print system would wait until the entire system is up to normal operating temperatures before printing.

Embodiments of examples of these processes are shown in FIGS. 3 and 4. In FIG. 3, the print system is to be operated at 40 in whatever mode is indicated by usage data, in whatever form the usage data takes. If a user presence is detected at 42, the print system operation is adjusted to a higher mode at 44. Depending upon the nature of the presence detected, the print system may move from a sleep power mode to a low power mode, a sleep power mode to a ready power mode with an option to print at reduced temperatures, or from a low power mode to a ready power mode.

For example, if the print system is in a sleep power mode and movement is detected at a very low level, the print system may move from the sleep power mode to low power mode. If the print system is in sleep power mode or low power mode, the print system may move to a ready power mode if the user presence is high or in the immediate area.

If no user presence is detected at 42, the print system may enter a lower power mode than the current mode at 46. If the usage data has the print system at full power and no presence is detected, the print system may enter a low power mode or a sleep power mode. If the print system is in a low power mode and no user presence is detected, the print system may enter a sleep power mode.

In addition, it is possible that the presence detected or a lack of a presence detected may match the power mode in which the print system is already operating. In this case, the mode may be considered to be adjusted, in that the mode is confirmed.

Detection of a user presence or absence may be problematic. Possible problems include: the printer being positioned in a structure such that the light/motion detector is substantially covered, the motion of non-user objects like the flapping of curtains or the motion of an object not within the building, i.e., through a window. However, employing a time period or other mechanism to provide a boundary to the presence detector, it would be possible for the controller or presence detector to decide that no user or users are present. FIG. 3 an example of one of a number of possible algorithms that could potentially be used to analyze the combined usage and motion patterns. Other, more complex algorithms are possible and could make predictions through analysis of frequency, time, and duration etc. whether the event was likely "human" or "other" and predict the probability of print jobs occurring based on the motion information.

For example, the presence detector or controller may set a time period to elapse in five minutes. If no presence is detected in five minutes, the presence detector may send a signal indicating no users are present. Alternatively, if the controller set the time period, the controller may determine that there is no user presence if no presence is detected after the time elapses. The amount of time selected in this example may be determined by the nature of the sensor, as well as the conditions surrounding the print system, as possible factors. If the print system is in a high-traffic area, for example, it may require a longer period of time to allow the controller to 'learn' the difference between normal activity in the area and someone actually approaching the print system. In whatever manner the parameters are set for a user absence or 'no user presence,' the resulting determination of such will cause the print system to enter a lower power mode than its current mode.

In either case, whether the print system is moved to a higher or lower power mode relative to its current mode, the resulting adjusted mode may be stored for further analysis or adjustment of the usage data at 48. This may include storing the results of the mode adjustment, storing the current setting and the presence data in whatever form that may take such as a detected voltage due to a change on a sensor, a user image, etc. Alternatively, the usage data for that period of time or other parameter by which the usage data is organized may just be set to the adjusted mode. It must be noted that where the usage data and the presence detection or lack thereof results in no change, that result may be stored as well as a verification of the previous usage data.

FIG. 4 shows an example of a process in which a presence detector input causes the print system to control the warm up cycle for a print request received in a less-than-full power mode, between low power and ready power. The print system receives a print request at 50, when the print system is in either a sleep power or low power mode. At 52, the print system begins to warm. At 54, if the print system warm up state is monitored while at 56 the presence detector is monitored for a user presence at the print system. These are show in serial fashion in the example of FIG. 4, but the print system may achieve them in parallel or in an alternative order.

The results of the two conditions combine to determine when the print system prints. If the print system warms up before or at the point when a user appears, the print system will print at ready power as shown at 60. If a user appears before the print system is at ready power, the print system will print with adjusted settings as discussed previously at 58. If the print system is not warm and there is no user, the system will not print.

In this manner, a presence detector adds to previously set usage data to allow more accurate predictions of print processes, thereby allowing the print system to achieve faster warm up times in printing. This will result in higher user satisfaction in solid ink jet printing systems, as well as many other printing systems that require a warm up.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. A method of operating a print system, comprising:
- access a storage to acquire usage data, the usage data containing information about past usage of the system;
- operating the print system in a first mode determined by the usage data;
- receiving an input from a presence detector, the presence detector arranged to detect a presence of a user;
- communicating with the presence detector to acquire information about the user presence; and
- adjusting operation of the print system to a second mode based upon a combination of the usage data and the information about the user presence.

2. The method of claim 1, the method further comprising storing the combination and a print result.

3. The method of claim 1, wherein receiving the input from the presence detector further comprises receiving a signal indicating a user presence.

4. The method of claim 3, wherein adjusting operation of the print system further comprises adjusting operation of the print system to the second mode that is a higher power mode than the first mode.

5. The method of claim 1, wherein receiving the input from the presence detector further comprises determining that no user is present.

6. The method of claim 5, wherein adjusting operation of the print system further comprises adjusting operation of the print system to the second mode that is a lower power mode than the first mode.

7. The method of claim 5, wherein determining that no user is present further comprises:
- monitoring the presence detector for a predetermined period of time;
- if the predetermined time elapses and no signal is received from the presence detector, determining that there is no user present.

8. A method of operating a print system, comprising:
- receiving a print request from a user across a network;
- warming up the print system to a ready power mode;
- receiving an input from a presence detector indicating a user presence;
- determining that the print system is not in the ready power mode;
- printing the print request when the print system is not yet at the ready power mode, if the input from the presence detector indicating a user presence is received prior to the print system achieving the ready power mode, adjusting printing operation parameters to allow the print system to print before achieving the ready power mode.

9. The method of claim 8, wherein operating the print system further comprises operating the print system in one of either a sleep mode or a low power mode.

10. The method of claim 8, wherein printing the print request further comprises printing when the print system achieves the ready power mode, if no user presence is detected.

11. The method of claim 8, wherein adjusting the print system operation parameters further comprises adjusting at least one of: a drum temperature, a transfix roller velocity, a media preheat setting, a print head temperature, a print head voltage, a print head waveform, and an ink jetting frequency.

* * * * *